3,631,136
WHITE TO LIGHT-COLORED, DETERGENT-RESISTANT COATING COMPOSITION
Lester L. Spiller, Indianapolis, Ind., assignor to Ransburg Electro-Coating Corp., Indianapolis, Ind.
No Drawing. Filed Aug. 18, 1965, Ser. No. 480,760
Int. Cl. C08g 51/24
U.S. Cl. 260—29.3          23 Claims

ABSTRACT OF THE DISCLOSURE

White or light-colored aqueous coating compositions suitable for an electrophoretic coating process and exceptionally resistant to discoloration and detergents comprise (1) a polyester resin which has an acid number of 40 to 70 and which is a condensation product of an aromatic acid having more than two carboxyls, alkylene glycols (preferably in excess), and a saturated dicarboxylic acid, (2) a di- to hexa-alkoxyalkylene-substituted polyamine crosslinking agent, and (3) a suitable pigment. The resin is preferably solubilized by reaction with ammonia or an amine (preferably a tertiary amine). The composition is applied by impressing a sufficient voltage between an electrode and the article to be coated to provide an initial current density of at least 300 milliamperes per square foot of surface.

---

This invention relates to improved electro-deposited coating compositions, to new and useful aqueous-electrophoretic coating methods, and to improved detergent-resistant coatings which may be deposited thereby, and especially to a white or off-white, aqueous-base coating composition which may be deposited electrophoretically with advantage.

The application of coatings by aqueous electrophoresis has manifold advantages over conventional methods of applying coatings such as by dipping, spraying, brushing and the like. For instance, by applying a coating to an article of manufacture by spraying or brushing, it is not always possible to contact all surfaces of the article or material to be coated, whereas, in coating by dipping, before drying, baking and the like, the coating tends to run or drip. This results in a relatively thick coating on the lower portions of the article, with a thinning or virtual complete lack of coating remaining on the upper surfaces.

It is also known that aqueous-base coatings may be applied to an article of manufacture by a process known in the art as electrophoresis. In this process, the article is immersed within the liquid containing a resin and pigment and suitable electrical connections made such that the article becomes one of the electrodes. After this, a direct potential is applied with the results that a coating is electro-deposited upon the article.

In order for the aqueous electrophoretic deposition of coatings to be effective, it is necessary that the charge and size of both the resin particles and pigment particles used in the coating liquid be carefully controlled so that a proper ratio of resin-to-pigment is electrodeposited upon the article. Heavy pigments tend to settle out of the liquid phase; and, in some instances, proper particle size cannot be obtained.

Aqueous-base coating compositions heretofore proposed for electrophoretic coatings have not been satisfactory for the production of white or off-white coatings. Resins which are suitable for use with colored pigments, other than white or off-white pigments, are discolored heavily when baked or cured at elevated temperatures together with white or off-white pigments; and the remaining known resins of the prior art, which do not discolor when baked with white or off-white pigments, are unable to withstand detergent-tests (i.e. detergent-resistance tests) after baking or curing. As a result, presently there is not available commercially, an aqueous-coating formulation which, after electrophoretic deposition and baking or curing, has satisfactory resistance to detergents and which also retains a white or off-white color. In performing such electrophoretic coating processes utilizing white or off-white pigments, therefore, it is manifest that the particular resinous materials, resin-forming components and/or the type of resins utilized are extremely critical.

Accordingly, it is an object of the present invention to produce electrophoretic coating compositions of high resistance to soaps, detergents and the like, and particularly to produce such compositions (containing, for example, titanium dioxide pigments which may be used in the formulation of either white and/or off-white coatings which are electro-deposited.

It has now been discovered that there is produced, by the electrophoretic deposition from aqueous suspensions of white or off-white pigmented compositions, detergent-resistant coatings which do not discolor upon baking or curing, providing there is present in the electrophoresis bath a combination of a particular type of at least one certain form of aromatic polyester resin together with a special type of at least one certain form of resinous or resin-forming polyamine base compound or derivative capable of reacting with the hydroxyl, carboxyl and/or alkylol groups of the said polyester resin so as to crosslink the same at elevated temperatures such as used in curing or baking of the resulting electrophoretically-deposited coating.

In order to obtain the best electrocoatings, it has also been found that, preferably, the aromatic polyester resins should comprise particular types of certain nitrogenous-base solubilized, aromatic polyester resins, whereas the resin-forming polyamine base compounds or derivatives advantageously comprise special types of certain primary di- to hexa-amine base compounds (or derivatives) having reactive hydrogen atoms of alkylol groups therein blocked by hydrocarbon groups (e.g. $C_1$ to $C_8$ hydrocarbon groups, preferably alkyl groups). Such derivatives of di- to hexa-amino triazines as described hereinafter are even more especially preferred. More particularly, such resin-forming di- to hexa-aminotriazine compounds preferably contain $C_1$ to $C_4$, especially $C_1$ or $C_2$ saturated aliphatic hydrocarbon-blocked oxyalkylene groups, the said aminotriazine compounds or derivatives being capable of reacting with excess hydroxyl, carboxyl and/or alkylol groups of the polyester resin at elevated temperatures of about 250° F. to 400° F., usually about 300° F. to about 375° F., as are encountered in the customary or conventional baking used for curing coatings comprising polyester resins.

For the purposes of the present invention, the polyester resin, which is utilized in the aqueous-electrophoretic bath, together with the aforesaid resin-forming polyamine, advantageously is formed by reacting aromatic acids having 3 to 6 carboxyl groups, especially 3 or 4 carboxyl groups (of which 3 carboxyl groups are preferred), and/or the corresponding anhydrides of such aromatic acids, together with a particular lower alkylene glycol, and also with a minor proportion (e.g. 5 to 20 weight percent) based on the amount of polyester resin formed, of an organic saturated dibasic acid.

Also, with respect to the said polyester resin, the mole ratios of the reacting components preferably are selected so that the molar amount of the more volatile alkylene glycol is in excess compared to an equivalent molar amount of both the dibasic acid and aromatic tricarboxylic acid or anhydride present. In order to form the aforementioned polyester resin, customary condensation procedures used for making polyester resins generally are followed. Advantageously, the reaction or condensation temperature used is between 250° F. or 300° F. and 450°

F., preferably 350° F. to 380° F. or 400° F. The reaction usually is conducted for about 2 to 20 or 30 hours (generally 5 to 10 or 15 hours), and until the resulting polyester resin formed has an acid number of 40 to 70 and preferably 50 to 60.

It is a further finding of the present invention that particularly outstanding polyester resins are formed, for use in aqueous electrophoretic coatings which contain a resin-forming polyamine, wherein there is present in the electrophoresis bath together with such polyamine, a special aromatic-polyester resin which comprises the reaction (i.e. condensation) product of (a) a polyhydric alcohol comprising a $C_2$ to $C_{10}$ (desirably a $C_3$ to $C_7$) alkylene glycol, preferably a $C_4$ to $C_6$ isoalkylene glycol, and even more especially an isopentylene glycol such as neopentylene glycol; (b) a benzene polycarboxylic acid having more than 2 carboxyl groups and preferably an anhydride of such acid, such polycarboxylic acids and anhydrides including, among others, benzene tri- to hexa-carboxylic acids and/or the anhydrides of such acids, as, for example, mellitic acid anhydride (i.e. benzene hexacarboxylic acid anhydride), trimellitic acid (i.e. 1,2,4-benzene tricarboxylic acid), and/or preferably, trimellitic acid anhydride (i.e. 1,2,4-benzene tricarboxylic anhydride); and (c) a minor proportion based on the resulting resin-condensate formed of a $C_2$ to $C_{20}$, advantageously a $C_5$ to $C_{15}$ saturated dibasic acid, preferably adipic acid. The resulting polyester resin advantageously is solubilized by treatment with a nitrogeneous base, such as ammonia, an amine which is generally a tertitary amine such as morpholine and, preferably, a hydroxylated tertiary amine such, for example, as a lower trialkanolamine, especially triethanol amine.

Particularly outstanding detergent-resistant, white and off-white pigmented coatings are produced by utilizing, in the aqueous electrophoretic bath, a ratio of about 1.0:0.5 to 1.0:4.0 of the resinous or resin-forming polyamine-base compound (more particularly described hereinafter) to the solubilized or modified polyester resin just described. The preferred ratio of resinous polyamine-base compound or derivative to the solubilized polyester resin is about 1.0:1.0 to 1.0:2.5, respectively, on a weight basis.

In order to derive the benefits of the present invention, there is admixed with the solubilized polyester resin defined hereinbefore, the foregoing amounts of such resinous polyamine-base compounds or derivatives as the lower alkoxyalkylene adducts of di- and/or especially tri-amine base compounds, preferably methoxy (or ethoxy) methylene (or ethylene) derivatives of such polyamine intermediates as organic diamines and/or especially triamines. Representative organic diamines and triamines (i.e. polyamino base compounds, adducts or intermediates) include among others, guanidine, carbamyl urea, formoguanidine and/or more desirably, urea and/or dicyandiamide and/or even more especially, melamine (i.e. 2,4,6-triamino triazine) and/or certain alkyl melamines, aryl melamines, alkaryl melamines and/or aralkyl melamines. Furthermore, certain other resin-forming polyamine-base compounds, which are similar to the hereinbefore described polyamino compounds, may likewise be used providing such compounds are modified to form derivatives which contain at least 2 and preferably at least 3 alkoxyalkylene groups, as more fully described hereinafter.

The preferred resinous or resin-forming polyamine-base derivatives or compounds, capable of reacting at elevated temperatures with the hydroxyl, carboxyl, and/or alkylol groups of the polyester resin, comprise polyalkoxyalkylene derivatives of amino triazines including not only melamine (supra), but also certain N-substituted melamines, particularly N-alkyl melamines and/or N-aryl melamines and/or N-alkaryl melamines and/or N-aralkyl melamines and related amino triazines, although melamine pre se is preferred. Larger numbers of other diverse types of amino-triazines also may, in certain instances, be employed. For example, one may employ, as polyamino base compounds or intermediates, certain of the amino-triazines set forth in U.S. 2,635,083.

The requisite resin-forming derivatives of the foregoing polyamine (preferably triamine) intermediates or adducts contain at least 2 and preferably at least 3 alkoxyalkylene groups and preferably comprise reaction products of the polyamine intermediate and an aldehyde. The aldehyde which is employed generally comprises formaldehyde and/or an organic donor compound yielding formaldehyde such, for example, as para-formaldehyde. A principal function of the formaldehyde component of the polyamine-base compound or intermediate is to produce a first derivative thereof containing a plurality of alkylol (preferably methylol) groups which, in the case of melamine, is at least 3 alkylol groups.

The aforesaid first alkylol-polyamine derivative is resinous and also adds functionality so it reacts with the polyester resin and causes cross-linking. However, the initial result is that such first resinous polyamine derivative, with ethylol and/or especially methylol groups, is relatively unstable, even at room temperature. It is, therefore, advantageously modified in accordance with the invention as above indicated to form a second derivative in which the alkylol groups of the polyamine-base compound or intermediate are converted to alkyoxyalkylene groups and/or certain other hydrocarbon oxyalkylene groups, which are not only stable at room temperature, but are also stable at somewhat elevated temperatures, yet they are capable of reacting, with loss of an alcohol at baking (or curing) temperatures (e.g., 300° F. to +450° F.), with hydroxyl, carboxyl, and/or alkylol groups generally found to be in excess in the polyester resin at such elevated baking temperatures. The second resin-forming polyamine-base derivative or compound preferably contains at least 2 or 3 alkoxyalkylene groups and even more desirably 4 to 6 (especially 5 or 6) alkoxyalkylene groups per molecule.

Another discovery of the invention is that the resin-forming hexa-methoxymethylene melamine compound (i.e. the second resin-forming derivative of 2,4,6-triaminotriazine containing six combined alkoxyalkylene groups) is particularly advantageous for the purposes of the present invention of producing white to off-white, detergent-resistant coatings by aqueous electrophoresis when also utilizing the polyester resins hereinbefore described.

The aforesaid resin-forming hexa-methoxymethylene derivative of melamine further has been found to be, in most instances, superior to the alkoxyalkylene derivatives of diamine base compounds such, for example, as urea and/or dicyandiamide disclosed hereinbefore, as well as the other resin-forming tri- to hexa-alkoxyalkylene melamines tested but, nevertheless, listed hereinafter as also advantageous inasmuch as they are desirable in certain applications.

Such other advantageous resin-forming tri- to hexa-alkoxyalkylene melamines, which are desirable in most instances for the purposes of the present invention in depositing light-colored, detergent-resistant coatings by elec-trophoresis from aqueous media include, among others, hexa-ethoxymethylene melamine, penta-methoxyethylene melamine, tri-methoxymethylene melamine, tetra-ethoxyethylene melamine, mixtures thereof, and other tri- to hexa-methoxy (or ethoxy) methylene (or ethylene) melamine compounds similar to those just listed.

The electrophoretic compositions of the present invention further contain about 5 to 25 weight percent or more based on total resins of light-colored pigments of a particle-size of about 5 or 10 (e.g. 7) or less on the Hagmen Gauge and are preferably white pigments of which at least part (preferably most) is white titanium dioxide or other conventional white or off-white pigments. Preferably, up to 5 or 10 weight percent of added basic lead silico chromate also may be present to improve corrosion resistance. Other desirable components of the composition of the present invention, whereby to produce non-discoloring, white and off-white coatings by electrophoretic deposition which are of improved detergent-resistance may optionally comprise a modicum of added zinc oxide and/or especially an amine-montmorillonite-clay reaction-product, of which the reaction-products of amines with bentonite clay are preferred. The zinc oxide aids in cross-linking during baking and the bentonite-amine reaction products, which are known in the art as "Bentones," assist the white titanium dioxide pigment in holding its electric charge. Preferred bentonite-amine reaction products comprise about 0.1 to 8.0 weight percent based on titanium dioxide pigment of the bentonite salt formed by the ion-exchange of bentonite with a $C_{10}$ to a $C_{14}$ aliphatic primary or secondary amine. Within this definition, the amine-montmorillonite clay reaction product comprising dimethyl-dioctyldodecyl ammonium bentonite is especially preferred.

Still another finding of the present invention is that driers such as manganese (or lead) naphthenates and drying oils generally should not be employed in the improved compositions for electrophoretic-coating and that it is advantageous to comminute substantially simultaneously the combined resins and pigments (as well as the bentonite-amine reaction products, if present) into particle-sizes of about 2 to 10 or 15, and preferably less than 7, on the Hagmen Gauge. For this purpose, a 3-roll mill has been found to be particularly suitable.

In order to more fully illustrate, but not to limit the present invention, the following examples are given. In the examples, the particle size of the ingredients is 7 on the Hagmen gauge and the ingredients or components are dispersed in 3800 grams of distilled water to produce electrophoretic coating compositions.

EXAMPLE I 1000 grams of a polyester resin are formed by heating, for 7 hours at 375° F., 395 grams of 1,2,4-benzene tricarboxylic acid anhydride, 498 grams of neopentylene glycol, and 107 grams of adipic acid. After reaction for 7 hours, the resulting polyester resin is found to have an acid number of 50–60 (e.g. 55), the foregoing aromatic polyester resin being modified into solubilized-form by reaction with dimethylethanolamine until the resulting polyester resin is soluble in an aqueous solution having a pH of 6.0 to 7.5 (e.g. 6.75).

1000 grams of the above solubilized polyester resin are blended according to the following formulation:

| Component: | Grams |
|---|---|
| Solubilized polyester resin | 1000 |
| Resinous hexamethoxymethylene melamine | 500 |
| Titanium dioxide (Rutile-form) | 196 |
| Dimethyl dioctyldodecyl ammonium bentonite | 4 |

The foregoing formulation, as with all other formulations mentioned hereinafter, is ground on a 3-roll mill until a particle-size of 7 on the Hagmen gauge is obtained with a resulting paste being formed. It is this paste which is dispersed into the 3800 grams of distilled water to give a solids content of 12.5 weight percent.

The resulting dispersion is electrodeposited on steel plates at 20 to 120 volts (e.g. 40 volts), the electrodeposition time being 1.0 minute, the electrode separation being 2.0 inches, and the electrophoretic aqueous bath temperature being 78° to 85° F. After deposition or plating, the metallic plates, electro-coated with the above composition, are rinsed with cold tap water, air dried and then baked at 350° F. for 20 minutes. The resulting plates have a good color, gloss, adhesion and deposition, no discoloration being noted. At an electromotive force of 40–50 volts (e.g. 45 volts), an 0.3 mil thickness of coating results, whereas at 100 to 110 volts, an electrophoretic coating results which is 0.7 mil thick.

EXAMPLE II

The same general procedure as in Example I is repeated except that 20 grams of tribasic lead phosphosilicate is substituted for 20 grams of the 196 grams of titanium dioxide pigment. Also, 3 percent of the ammonium salt of sulfonated naphthalene formaldehyde condensate is added to facilitate the dispersion of the added tribasic lead phosphosilicate pigment.

Electrodeposition is with 40 volts to 120 volts at a bath temperature of 78° to 85° F. for 1 minute, the bake being at 350° F. for 20 minutes. A voltage of 40 to 50 volts gives an 0.3 mil thickness and a voltage of 100 to 110 gives 0.7 mil thickness. The resulting electro-deposited coatings have off-white color, good gloss, adhesion and deposition rates, but the coatings formed are not as smooth as in Example I.

EXAMPLE III

The same general procedure as in Example I is again repeated except that the pigment combination consists of 193 grams of titanium dioxide together with 3 grams of basic lead silico chromate. This composition is electroplated at 40 to 120 volts in an electrophoretic aqueous bath at a temperature of 78° to 85° F. for 1 minute, the bake being at 350° F. for 20 minutes. The resulting deposition has good color, gloss, adhesion and deposition rates, each comparable to those of Example I.

EXAMPLE IV

The same general procedure as in Example I is repeated except that after the electrophoretic deposition of the components in Example I, there is then sprayed, on top of each respective electro-deposited primer layer, a commercial rutile titanium dioxide pigmented acrylic-epoxy resin combination, as shown hereinafter and in column 9, lines 1 to 14 inclusive of U.S. Patent No. 2,870,117. The $TiO_2$ white-pigmented acrylic-epoxy resin enamel composition shown below is sprayed as a top coat, with the following components thereof being cut to 20 seconds with xylene:

| Component: | Parts by weight |
|---|---|
| Rutile titanium dioxide | 207 |
| Formaldehyde modified acrylamide interpolymer solution | 647 |
| Epoxy resin solution (60 percent solution in 15 percent methyl isobutyl ketone and 25 percent xylol; molecular weight of resin about 900) | 53 |
| Pine oil | 10.5 |
| Cellosolve acetate | 20 |
| Silicone solution | 2 |
| Phosphoric acid solution (8½ percent solution in butanol) | 18 |

Primer thicknesses of 0.3 mil and about 0.7 mil are obtained on different samples by increasing the voltage as in the preceding examples. Total thickness in mils, after the application of the top coat by spraying, is 1.5 mils and 2.2 mils, respectively. The resulting depositions have good white color, gloss, adhesion and deposition rates, each comparable to those of Example I.

EXAMPLE V

Gloss readings are taken of the foregoing coatings of Examples I through IV, inclusive. The detergent testing temperature is 135° F. and the detergent testing time after which gloss readings are taken is 250 hours. Gloss readings are taken on a Gardner portable 60° gloss meter with the following results; the higher the Gloss Meter Reading, the better, with Gloss Readings of 60 or more being satisfactory and those of 70 or more being excellent:

GLOSS METER DATA

| Example | Pigment | Detergent additive | Gloss reading |
|---|---|---|---|
| I | Titanium dioxide | Sodium pyrophosphate | 70 |
| II | Tribasic lead phosphate | Sodium sulfate | 65 |
| III | Titanium dioxide-basic lead silico chromate combination | Linear alkylate detergent | 75 |
| IV | Titanium dioxide | 25 percent aqueous solution of soap | 73 |

The above data shows that satisfactory detergent resistance results are obtained in all examples using the combination of resins of the invention. The data shows that the incorporation of either a titanium dioxide pigment or a combination of titanium dioxide together with basic lead silico chromate produces excellent results. In all examples, the pH of the solutions tested is 8.40 to 8.55.

Further tests show good to excellent results with not only the 12.5 weight percent solids-content (employed in the examples), but also over a range of from 4 percent to 30 percent solids-content, preferably a 6 or 8 to 25 or 30 percent solids-content (e.g. 5 to 25 percent solids-content) and varying the pH between about 8.0 and 9.5. Also, the electrophoretic bath temperature is varied from 70° F. to 100° F. with good to excellent results. Furthermore, curing or baking temperatures of 250° F. or 300° F. to 380° F. or 400° F. are found to be operative for the purposes of the invention, with curing times varying between 3 and 20 minutes, the lower the curing temperature, the longer the curing time and vice versa. For instance, optimum baking or curing times are about 5 to 7 minutes at 350° F. and about 8 to 12 minutes at 300° F.

Although in the examples of the present invention an electromotive force of between 40 and 110 or 120 volts usually is applied at the electrode-spacing of 2.0 inches (i.e. about 1.5 to about 2.5 inches), when the electrode-spacing is substantially altered from about 1.5 to 2.5 inches, the required electromotive force will also, necessarily, have to be changed, correspondingly.

The voltage used, in accordance with the invention, is not only dependent upon such electrode spacing, but also upon the types and concentrations of the resin-combinations and the pigments and additives employed in the aqueous electrophoretic bath. These factors and others, such as the ratio of the pigment(s) to the resinous combinations, result in the electrophoretic medium exhibiting a predetermined or given resistivity which, in turn, requires an appropriate or resulting D.C. voltage for proper electrophoretic coatings in the practice of the present invention.

In general, the D.C. potential initially required is found to be 30 or 35 volts to about 250 or 300 volts. However, the preferred E.M.F. used is from about 40 or 50 volts to about 150 or 180 volts. Still too, after the articles immersed in the aqueous electrophoretic pigmented resin-combination bath of the invention have become substantially coated uniformly, with even miniscule amounts of the coating composition of the present invention, voltages desirably are increased.

However, voltages generally are utilized such that the initial current density is from a minimum of about 0.3 or 0.5 ampere per square foot (and in certain instances substantially higher) up to preferably such that the initial current density is not over about 20 or 25 amperes per square foot of material being electro-coated. An even more desirable voltage range, particularly useful in the practice of the present invention, is such that the initial current density is about 1.0 to about 10 or 15 amperes per square foot.

With lower current densities, a longer deposition time is necessary for the aqueous-electrophoretic coatings of the invention; and this time is desirably about 0.3 minute to about 10.0 or 20.0 minutes or so, and even more especially, from about 0.6 minute to about 1.5 or about 5.0 minutes. Conversely, at higher current densities, a lesser amount of time is required for the electrophoretic deposition of a proper amount of a white or off-white, detergent and soap-resistant coating, in accordance with the present invention.

Resort may be had to modifications and variations of the disclosed embodiments without departing from the spirit of the invention or the scope of the appended claims.

What is claimed is:

1. A white to light-colored, detergent-resistant electrophoretic coating composition which comprises a resinous combination useful for dispersion together with a minor proportion based on said resinous combination of a white to light-colored pigment wherein at least a portion of the pigment includes titanium dioxide, said resinous combination being useful for the production of coatings comprising (1) a branched chain polyester resin formed by reacting (a) a member of the group consisting of aromatic poly-carboxylic acids having more than two carboxyl groups per molecule, and anhydrides of such acids; (b) $C_2$ to $C_7$ alkylene glycols; and (c) $C_2$ to $C_{20}$ saturated organic dibasic acids to an acid number of 40 to 70; together with (2) resin-forming di- to hexa-alkoxy alkylene-substituted polyamines capable of reacting, at an elevated temperature, with the hydroxyl groups, carboxyl groups and alkylol groups of said polyester resin.

2. A coating composition in accordance with claim 1 in which said resin-forming polyamine comprises a tri- to hexa-alkoxy alkylene triamino triazine.

3. A coating composition in accordance with claim 2 in which the resin-forming polyamine is present in an amount of about 0.25 parts by weight to about 1.50 parts by weight, per part by weight of said polyester resin.

4. A coating composition in accordance with claim 3 in which said composition contains a white titanium dioxide pigment having a particle size of not more than about 10 on the Hagmen scale and the continuous phase of said coating composition, in which said pigments and said resins are dispersed, is water, the pH of the resulting aqueous composition formed being about 8.0 to about 9.5.

5. A white to off-white colored, detergent-resistant, pigmented resinous electrophoretic coating composition which comprises an aromatic polyester resin which has been water-solubilized, said polyester resin being produced by reacting (1) a member selected from the group consisting of aromatic polycarboxylic acids having at least three carboxyl groups per molecule and anhydrides of such acids, (2) $C_3$ to $C_7$ alkylene glycols and (3) a minor proportion, based on total resulting polyester resin, of $C_5$ to $C_{15}$ saturated dibasic acids, said aromatic polyester resin having a molar excess of hydroxyl groups relative to the total carboxyl groups present in said resin and having an acid number of 40 to 70, said solubilized aromatic polyester resin being in admixture with a resin-forming tri- to hexa-alkoxy alkylene-polyamino-triazine and a pigment, at least a portion of said pigment includes titanium dioxide.

6. A coating composition in accordance with claim 5 in which the solubilized polyester resin comprises a tertiary amine reaction product with said polyester resin, said resin being the condensation-product of a benzene tri- to hexa-carboxylic acid anhydride and a $C_4$ to $C_6$ isoalkylene glycol together with about 5 to 20 weight percent, based on total polyester resin, of a $C_5$ to $C_{15}$ saturated dibasic acid.

7. A coating composition in accordance with claim 5 in which the polyester resin is solubilized by treatment with a di- to trialkanolamine, said polyester resin comprising the reaction product of a minor proportion of a benzene tricarboxylic acid anhydride and a major proportion of a $C_5$ isoalkylene glycol, together with a minor amount, based on total polyester resin, of adipic acid.

8. A coating composition in accordance with claim 5 in which the resin-forming polyamino triazine comprises a tri- to hexa-methoxymethylene triamino-triazine.

9. A coating composition in accordance with claim 5 in which the polyester resin comprises a dimethyl ethanolamine-solubilized reaction product of 1,2,4-benzine carboxylic acid anhydride and a major proportion of an isopentylene glycol, together with about 5 to 20 weight percent, based on total polyester resin formed, of adipic acid, said polyester resin having an acid number of about 40 to 70.

10. A coating composition in accordance with claim 9 in which the resin-forming polyamino triazine comprises hexa-methoxymethylene 2,4,6 - triamino - triazine, said polyester resin having an acid number of about 50 to 60.

11. A white to off-white pigment-containing electrophoretic coating composition which comprises a polyester resin containing the reaction product of a minor proportion of 1,2,4-benzene tricarboxylic acid anhydride and a major proportion of neopentylene glycol, together with about 5 to 20 weight percent, based on total polyester resin formed, of adipic acid, said polyester resin having a molar excess of hydroxyl groups relative to the carboxyl groups in the resin, said polyester resin having an acid number of 40 to 70 and being rendered water-soluble by contacting the resin with a hydroxylated tertiary amine, and a resin-forming hexa-methoxy-methylene 2,4,6-triamino triazine which is present in an amount less than the amount by weight of said solubilized polyester resin, said resin-forming triamino triazine being present in said composition in an amount sufficient to react with and crosslink hydroxyl, carboxyl and methylol groups of said polyester resin and a pigment, at least a portion of said pigment includes titanium dioxide.

12. A white to off-white detergent-resistant coating composition, useful at an alkaline pH in aqueous electrophoretic coatings and containing a resinous-combination together with a white titanium dioxide pigment having a particle size of not more than about ten on the Hagmen gauge, said resinous-combination comprising (1) a nitrogenous-base solubilized polyester resin having an acid number of about 40 to about 60 and being a condensation-product of a minor proportion of a member of the group consisting of benzene tricarboxylic acids and anhydrides of said acids, a $C_4$ to $C_6$ isoalkylene glycol, said glycol being present in an amount sufficient that there is present in said resin a molar excess of hydroxyl groups relative to carboxyl groups, together with about 5 to 20 weight percent, based on total polyester resin formed of adipic acid, and a minor amount, based on the weight of said solubilized polyester resin, of a resin-forming polyprimary amine consisting essentially of tri- to hexamethoxymethylene triamino-triazine.

13. A coating composition in accordance with claim 12 in which the pigment comprises an admixture of a major amount of said titanium dioxide and a minor amount of basic lead silico chromate which has a particle size of not more than about 10 on the Hagmen gauge, the total amount of pigment present in said composition being about 5 to about 25 weight percent based on the resinous-combination in said composition, the total solids content of the resulting aqueous electrophoretic composition formed being about 4.0 to about 30.0 weight percent.

14. A white to off-white, detergent-resistant coating composition which comprises a resinous-combination, useful in aqueous electrophoretic-deposition together with a minor proportion based on said resinous-combination of a titanium dioxide-containing pigment having a size of less than about 10 on the Hagmen Gauge, said resinous-combination comprising a solubilized polyester resin having an acid number of about 40 to 70 and being the reaction product of an aromatic polycarboxylic acid anhydride compound containing 3 carboxyl groups, a $C_4$ to $C_6$ isoalkylene glycol, and a minor proportion, based on the resulting condensate product formed, of a $C_5$ to $C_{15}$ dibasic acid, together with a resin-forming polyamine comprising a triamino triazine having 6 alkoxylalkylene groups, said resin-forming polyamine being present in an amount of about 0.25 weight percent based on said polyester resin up to about an amount equal to about 1.5 times the weight of said polyester resin, the resulting coating composition formed having a pH of about 8.0 to about 9.5, a total pigment content based on said resinous-combination of about 5 to 25 weight percent and a total solids-content of about 5 to 30 weight percent.

15. Coating composition in accordance with claim 14 in which said polyester resin contains a benzene tricarboxylic acid anhydride.

16. Coating composition in accordance with claim 14 in which said isoalkylene glycol is neopentylene glycol.

17. Coating composition in accordance with claim 14 in which said dibasic acid is adipic acid, said resin-forming polyamine containing hexa-methoxymethylene-2,4,6-triamino triazine.

18. Coating composition in accordance with claim 14 in which the pigment comprises a major proportion of the titanium dioxide and a minor proportion, based on total pigment, of added basic lead silico chromate.

19. Coating composition in accordance with claim 14 in which said polyester resin comprises a major proportion of the condensation polymerization product of 1,2,4-benzene tricarboxylic acid anhydride and neopentylene glycol together with a minor proportion of adipic acid.

20. Coating composition in accordance with claim 19 in which said resin-forming polyamine is present in a minor amount based on said polyester resin, said resin-forming polyamine being hexamethoxy-2,4,6-triamino triazine in an amount sufficient to promote cross-linking at baking temperatures with hydroxyl, carboxyl and alkylol groups of said polyester resin.

21. Coating composition in accordance with claim 20 in which said composition contains about 1.0 to 5.0 weight percent, based on total pigment, of added dimethyl dioctyldodecyl ammonium bentonite.

22. An aqueous base composition suitable for depositing detergent-resistant white and off-white coatings by electrophoresis, said coating composition comprising (1) a polyester resin which has an acid number of 40 to 70 and which is a condensation product of an admixture of a $C_3$ to $C_7$ alkylene glycol, a polycarboxylic acid compound which is a member of the group consisting of aromatic polycarboxylic acids having more than two carboxyl groups and anhydrides of such acids and having a molar excess of hydroxyl groups relative to the carboxyl groups of said polycarboxylic acid compound, and a $C_5$ to $C_{15}$ saturated dibasic acid, said condensation product formed being modified with a nitrogenous base to increase its water solubility, (2) a resin-forming cross-linking agent which is a derivative of a poly-primary amine, said resin-forming crosslinking agent having reactive hydrogen atoms of alkylol groups therein blocked by hydrocarbon groups and which is capable of reacting at baking temperatures for said electrophoretically deposited coating with methylol, hydroxyl, and carboxyl groups, (3) a white titanium dioxide pigment having a particle size of less than about ten on the Hagmen scale, and (4) water in an amount sufficient to constitute the continuous phase of said coating composition.

23. An aqueous base composition suitable for electrophoretic deposition of detergent-resistant white and off-white coatings, said composition comprising a polyester resin which has an acid number of 40 to 70 and which is a condensation product of a $C_4$ to $C_6$ isoalkylene glycol, a saturated aliphatic dicarboxylic acid, and an aromatic polycarboxylic acid compound selected from the group consisting of aromatic polycarboxylic acids having more than two carboxy groups and anhydrides of such acids, said condensation product being modified to increase its water solubility, a resin-forming aldehyde derivative of a poly-primary amine which has reactive hydrogen atoms of alkylol groups therein blocked by hydrocarbon groups and which is capable of reacting at baking or curing temperatures for the resulting coating with methylol, hydroxyl and carboxyl groups, a titanium dioxide pigment having a particle size of not more than about 10 on the Hagmen scale and a sufficient amount of water to constitute the continuous phase of said coating composition.

References Cited
UNITED STATES PATENTS

| | | | |
|---|---|---|---|
| 3,230,162 | 1/1966 | Gilchrist | 204—181 |
| 3,268,433 | 8/1966 | Abere | 204—181 |
| 3,340,172 | 9/1967 | Huggard | 204—181 |
| 3,449,228 | 6/1969 | Yurcheshen et al. | 204—181 |

DONALD J. ARNOLD, Primary Examiner

U.S. Cl. X.R.

260—29.2 E, 29.4 R, 38, 39 R, 40 R; 204—181